United States Patent

Rogers

[11] 3,847,389
[45] Nov. 12, 1974

[54] LOW-FRICTION SEAL
[75] Inventor: William A. Rogers, Costa Mesa, Calif.
[73] Assignee: Tanner Engineering Co., Wilmington, Calif.
[22] Filed: July 22, 1971
[21] Appl. No.: 165,409

Related U.S. Application Data
[63] Continuation of Ser. No. 783,868, Dec. 16, 1968, abandoned.

[52] U.S. Cl.............................. 277/153, 277/205
[51] Int. Cl............................ F16j 15/32, F16j 9/00
[58] Field of Search ......... 277/152, 153, 163, 205, 277/206, 181, 26, 211

[56] References Cited
UNITED STATES PATENTS

| 2,210,723 | 8/1940 | Kosatka | 277/163 X |
| 2,511,386 | 6/1950 | Warren | 277/152 X |
| 2,587,405 | 2/1952 | Stevens | 277/181 |
| 3,114,561 | 12/1963 | Creath et al. | 277/152 |
| 3,188,098 | 6/1965 | Skinner, Sr. | 277/153 |
| 3,223,426 | 12/1965 | Reid | 277/153 |

FOREIGN PATENTS OR APPLICATIONS

| 558,544 | 1/1944 | Great Britain | 277/206 |

Primary Examiner—Samuel B. Rothberg
Attorney, Agent, or Firm—Herzig & Walsh Incorporated

[57] ABSTRACT

A seal ring having a plastic jacket of channel shape in cross section with a helical spring therein, a portion of the jacket designed to form a lightly loaded sealing lip when installed.

4 Claims, 5 Drawing Figures

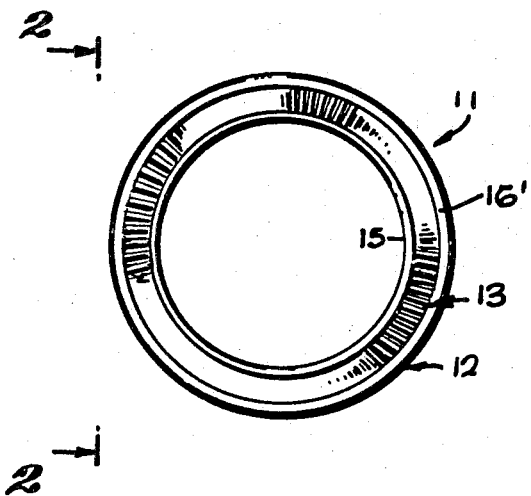
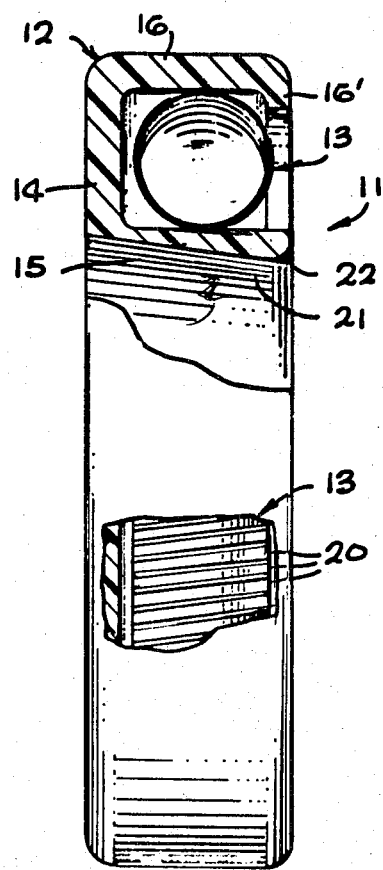
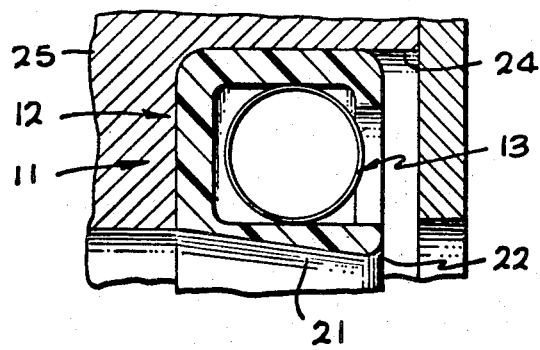
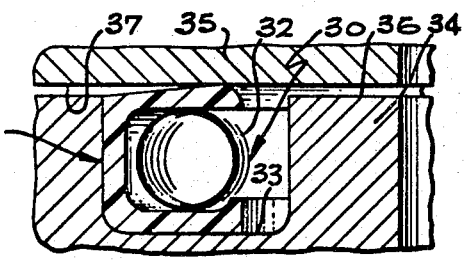
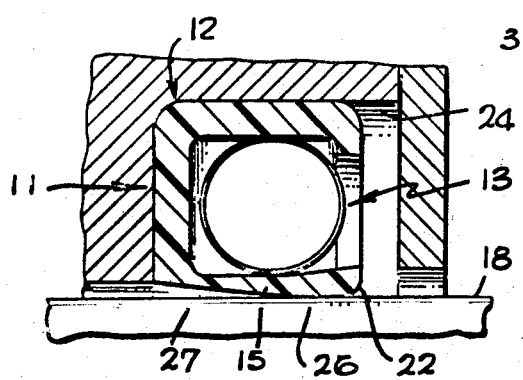

LOW-FRICTION SEAL

This application is a continuation of Ser. No. 783,868, filed Dec. 16, 1968, now abandoned.

This invention has to do generally with seal rings made of plastic and particularly with such rings as have an interior member to provide the desired resiliency and stiffness.

An object of the invention is to provide a new and improved seal ring having a jacket of generally channel-shaped configuration in cross section provided with an internal reinforcing spring that is designed, in conjunction with the jacket, to provide a seal with an extremely low-friction factor.

More particularly it is an object to provide a seal ring of the type indicated having a novel construction whereby when it is installed only a sealing lip portion of limited surface area engages and makes sealing contact with the surface against which the seal is to be effected.

These and other objects will be apparent from the drawing and the following description. Referring to the drawing:

FIG. 1 is an elevational view of a radial seal ring embodying the invention as seen looking axially thereof toward the open end or side of the ring.

FIG. 2 is an elevational view on line 2—2 of FIG. 1 broken away in part to show portions in sections, but on a larger scale;

FIG. 3 is a fragmentary cross-sectional view of the seal ring installed in a ring groove as it appears without the shaft against which it is to seal on the same scale as FIG. 2;

FIG. 4 is a view similar to FIG. 3, but showing the shaft installed and the position of the seal ring with relation thereto; and FIG. 5 is a fragmentary sectional view of a face seal embodying the invention and shown installed.

More particularly describing the invention, numeral 11 generally designates the seal ring which comprises an outer member or jacket 12 of plastic and numeral 13 generally designates an internal reinforcing spring. The jacket is preferably made of a plastic, such as Teflon, which is polytetrafluoroethylene resin. The jacket is generally channel shape in cross section and has a radially extending or radial end wall 14 and axially extending inner and outer walls designated 15 and 16, respectively, which extend from the end wall and are radially spaced a substantial distance.

In the form of the invention shown, the inner wall of the jacket acts as the sealing member which engages the member against which a seal is to be effected, such as a reciprocable shaft 18 shown in FIG. 4. It will be understood of course that the cross-sectional shape of the jacket, that is, the walls 14 and 15, may be reversed where it is desired that the sealing take place on the periphery of the jacket rather than on the inside thereof, as shown.

The outer wall 16 is provided with an inturned or radially inwardly extending rib 16' which serves to assist in retaining the spring 13 within the jacket. The spring itself is preferably a light, helically wound garter-type spring formed of flat metal strip material, the individual convolutions being designated 20.

The end wall 14 and outer wall 16 are preferably substantially stiffer than the inner wall 15 and for this purpose they may be made thicker than the inner wall as shown in the drawing. The inner wall 15 of the jacket is formed so as normally to have a smaller internal diameter at its free edge than where it joins end wall 14 and consequently it is formed to be thicker at its free edge than adjacent end wall 14. The particular seal shown has a substantially frusto-conical interior surface 21 on the wall 15 which terminates in a beveled or rounded end portion 22.

The dimensions of the ring are such that when installed in a groove 24 of a member 25 which is to contain the ring the end wall will not project beyond the groove but the portion of the inner wall at the free edge and for a distance back therefrom will project beyond the groove, as best shown in FIG. 3. When the shaft 18 is installed, as shown in FIG. 4, the spring is compressed slightly and the portion of the inner wall 15 of the jacket from its free edge inwardly toward its area of contact with the spring 13 is bent radially outwardly forming what in effect is a sealing lip that bears lightly against the surface of the shaft 18, the area of contact being indicated by numeral 26. In this connection it should be noted that the inner diameter of the inner wall 15 at end wall 14 and for a substantial distance therefrom toward the free edge is greater than the diameter of the shaft thereby providing clearance in the region 27.

Preferably the seal ring jacket is made slightly oversize in diameter with reference to the groove 24 so that there is firm engagement effecting a seal between the outer wall 16 and the bottom wall of the groove. Thus the seal ring is relatively rigidly installed, and this, together with the stiff construction of end wall 14 and outer wall 16 leaves only the inner wall 15 which can move or distort. Since a light backup or reinforcing spring is used, only a light but positive sealing pressure is exerted by the flexing of the lip portion of the wall 15.

The invention is also useful as a face seal, and in FIG. 5 I show an alternate form wherein the seal ring, designated 30, has a jacket 31 and an internal spring 32. The jacket has the same basic cross-sectional shape as the seal previously described except that the open side thereof is on the inside. The seal is shown mounted in an annular groove 33 in the flat face 36 of a member 34. It may be assumed that members 34 and 35 are bolted or otherwise secured together and that a seal is to be effected as between flat faces 36 and 37. It will be understood, of course, that where an outside face seal is required, the open side of the jacket would be on the periphery of the seal ring.

Although I have illustrated and described a preferred form of my invention, I contemplate that various changes and modifications can be made therein without departing from the invention, the scope of which is indicated by the following claims.

I claim:

1. A composite seal ring comprising:

an annular flexible jacket having a substantially U-shaped cross section defining a first bottom wall member and second and third flat surfaced wall members attached to opposite ends of said first wall member, said third wall member adapted to seal against an external surface; and an annular resilient member having a circular cross section located within said jacket and contacting opposing inner flat parallel surfaces of the second and third wall members inwardly of their free edges, the thickness of the first wall member and the second and third wall members being relatively thin with respect to the diameter of the circular cross section of the annular resilient member, said annular resilient member contacting the inside surface of said second wall member and said surface of said third wall member intermediate the free end of the third wall member and the first wall member for bending of the third wall member, said third wall member having a flat outer surface sloping from said bottom wall outwardly and away from said second wall whereby said third wall member has a thickness that varies from a maximum at the free end thereof to a minimum in the area of its connection to said first wall member and thus providing a flat sealing surface on the third wall member between the region of its contact with said annular resilient member and its free end.

2. A composite sealing ring according to claim 1 in which the third wall member at the maximum thickness end terminates in a rounded free end portion whereby sealing is enhanced during rotational and linear movements of the external surface.

3. A composite sealing ring according to claim 1 in which said annular resilient member comprises a helically wound spring.

4. A composite sealing ring according to claim 1 in which the sealing surface extends from the free end portion of the third wall member towards said first wall member and in which the length of the sealing surface is maintained by the action of the resilient member bending the third wall member.

* * * * *